(12) United States Patent
Monaghan et al.

(10) Patent No.: US 11,593,959 B1
(45) Date of Patent: Feb. 28, 2023

(54) SYSTEMS AND METHODS FOR DIGITALLY REPRESENTING A SCENE WITH MULTI-FACETED PRIMITIVES

(71) Applicant: Illuscio, Inc., Culver City, CA (US)

(72) Inventors: Robert Monaghan, Ventura, CA (US); Mark Weingartner, Woodland Hills, CA (US)

(73) Assignee: Illuscio, Inc., Culver City, CA (US)

( * ) Notice: Subject to any disclaimer, the term of this patent is extended or adjusted under 35 U.S.C. 154(b) by 0 days.

(21) Appl. No.: 17/937,077

(22) Filed: Sep. 30, 2022

(51) Int. Cl.
| | | |
|---|---|---|
| *G06T 7/586* | (2017.01) | |
| *G06T 7/70* | (2017.01) | |
| *G06T 7/90* | (2017.01) | |
| *G06V 10/24* | (2022.01) | |
| *G06V 10/771* | (2022.01) | |

(52) U.S. Cl.
CPC ............... *G06T 7/586* (2017.01); *G06T 7/70* (2017.01); *G06T 7/90* (2017.01); *G06V 10/245* (2022.01); *G06V 10/771* (2022.01); *G06T 2207/10024* (2013.01); *G06T 2207/10028* (2013.01)

(58) Field of Classification Search
CPC .. G06T 7/586; G06T 7/70; G06T 7/90; G06T 2207/10024; G06T 2207/10028; G06V 10/245; G06V 10/771
See application file for complete search history.

(56) References Cited

U.S. PATENT DOCUMENTS

| | | | | |
|---|---|---|---|---|
| 10,853,955 | B1 * | 12/2020 | Monaghan | .......... G06F 21/6209 |
| 2004/0004615 | A1 * | 1/2004 | Hiraga | ................... G06T 15/005 |
| | | | | 345/419 |

FOREIGN PATENT DOCUMENTS

| | | | | | |
|---|---|---|---|---|---|
| AU | 2018203328 | A1 | * | 11/2019 | |
| CN | 107784683 | A | * | 3/2018 | ........... G06T 15/005 |
| CN | 108259908 | A | * | 7/2018 | ........... G06K 9/4638 |

(Continued)

OTHER PUBLICATIONS

Lin et al. ("Free-viewpoint image synthesis based on non-uniformly resampled 3D representation," IEEE International Conference on Image Processing; Date of Conference: Sep. 26-29, 2010) (Year: 2010).*

(Continued)

*Primary Examiner* — Yubin Hung
(74) *Attorney, Agent, or Firm* — Ansari Katiraei LLP; Arman Katiraei; Sadiq Ansari

(57) ABSTRACT

Disclosed is a system and associated methods for generating and rendering a polyhedral point cloud that represents a scene with multi-faceted primitives. Each multi-faceted primitive stores multiple sets of values that represent different non-positional characteristics that are associated with a particular point in the scene from different angles. For instance, the system generates a multi-faceted primitive for a particular point of the scene that is captured in first capture from a first position and a second capture from a different second position. Generating the multi-faceted primitive includes defining a first facet with a first surface normal oriented towards the first position and first non-positional values based on descriptive characteristics of the particular point in the first capture, and defining a second facet with a second surface normal orientated towards the second position and second non-positional values based on different descriptive characteristics of the particular point in the second capture.

20 Claims, 9 Drawing Sheets

(56) References Cited

FOREIGN PATENT DOCUMENTS

JP          2016206766 A   *  12/2016
WO      WO-2016038240 A1 *   3/2016   ............. G06T 15/04

OTHER PUBLICATIONS

Smolic et al. ("Interactive 3-D Video Representation and Coding Technologies," Proceedings of the IEEE (vol. 93, Issue: 1, Jan. 2005)) (Year: 2005).*

Toh et al. ("An Optimal Object Representation For Aspect Classification," Proceedings of the IEEE/RSJ International Conference on Intelligent Robots and Systems; Date of Conference: Jul. 7-10, 1992) (Year: 1992).*

* cited by examiner

SYSTEMS AND METHODS FOR DIGITALLY REPRESENTING A SCENE WITH MULTI-FACETED PRIMITIVES

BACKGROUND

Pixels, polygons, meshes, and other primitives used for digital imagery store a single set of values to represent the colors and other non-positional information for a surface or point on a surface from all angles. For instance, each pixel, polygon, mesh, or other primitive stores red, green, and blue ("RGB") color values to represent the color that is captured or imaged for a surface or point on the surface by one or more imaging devices and/or one or more captures of that surface or point from different angles.

The single set of values result in an inaccurate representation of the captured surface or point. For instance, the colors of the actual surface in the real-world appear to change as the viewer's position relative to the actual surface changes. The changing color may be due to changes in lighting, reflections off the surface (e.g., surface reflectivity), human vision, and/or myriad of other factors. These subtle changes are not stored or preserved in the single set of values stored with the image primitives, and cannot be accurately reproduced when rendering the digital representation of the scene from different perspectives. Instead, the changes are computed using algorithms and are often inaccurate reproductions of the actual variation because the algorithm fail to account for the real-world factors at play causing visual variations.

DETAILED DESCRIPTION OF PREFERRED EMBODIMENTS

The following detailed description refers to the accompanying drawings. The same reference numbers in different drawings may identify the same or similar elements.

Provided are systems and methods for digitally representing a scene with multi-faceted primitives. Each multi-faceted primitive stores multiple sets of values, and each stored set of values represents color values and/or other non-positional characteristics captured for a surface or point on a surface from a different angle.

A polyhedron graphics system defines a set of multi-faceted primitives as part of polyhedral point cloud. Specifically, the polyhedron graphics system encodes the variations in colors and/or other descriptive characteristics across different surfaces or objects in a scene to the different facets of the set of multi-faced primitives.

The polyhedron graphics system defines each multi-faceted primitive of the polyhedral point cloud with a set of positional values. The set of positional values map the position of a surface or point about a surface from the scene to a corresponding position in a two-dimensional ("2D") or three-dimensional ("3D") space of the polyhedral point cloud.

The polyhedron graphics system also defines each multi-faceted primitive with two or more facets. Each facet is associated with a surface normal and a different set of non-positional values. The surface normal defines the orientation and/or the angle at which the non-positional characteristics represented by the set of non-positional values associated with that facet were imaged, measured, or otherwise captured for the surface or point about the surface or object that is represented by that multi-faceted primitive. In other words, the orientation of each facet is defined by a surface normal, and each facet is encoded to store the non-positional characteristics that are imaged or captured from the surface represented by the position of the multi-faceted primitive in the angle or direction of the facet surface normal. In this manner, the polyhedron graphics system preserves and encodes the descriptive characteristic variation that occurs across different surfaces or objects of a scene from different viewing angles or perspectives in the different sets of non-positional values associated with each facet of the multi-faceted primitives within polyhedral point cloud.

Figure 1:
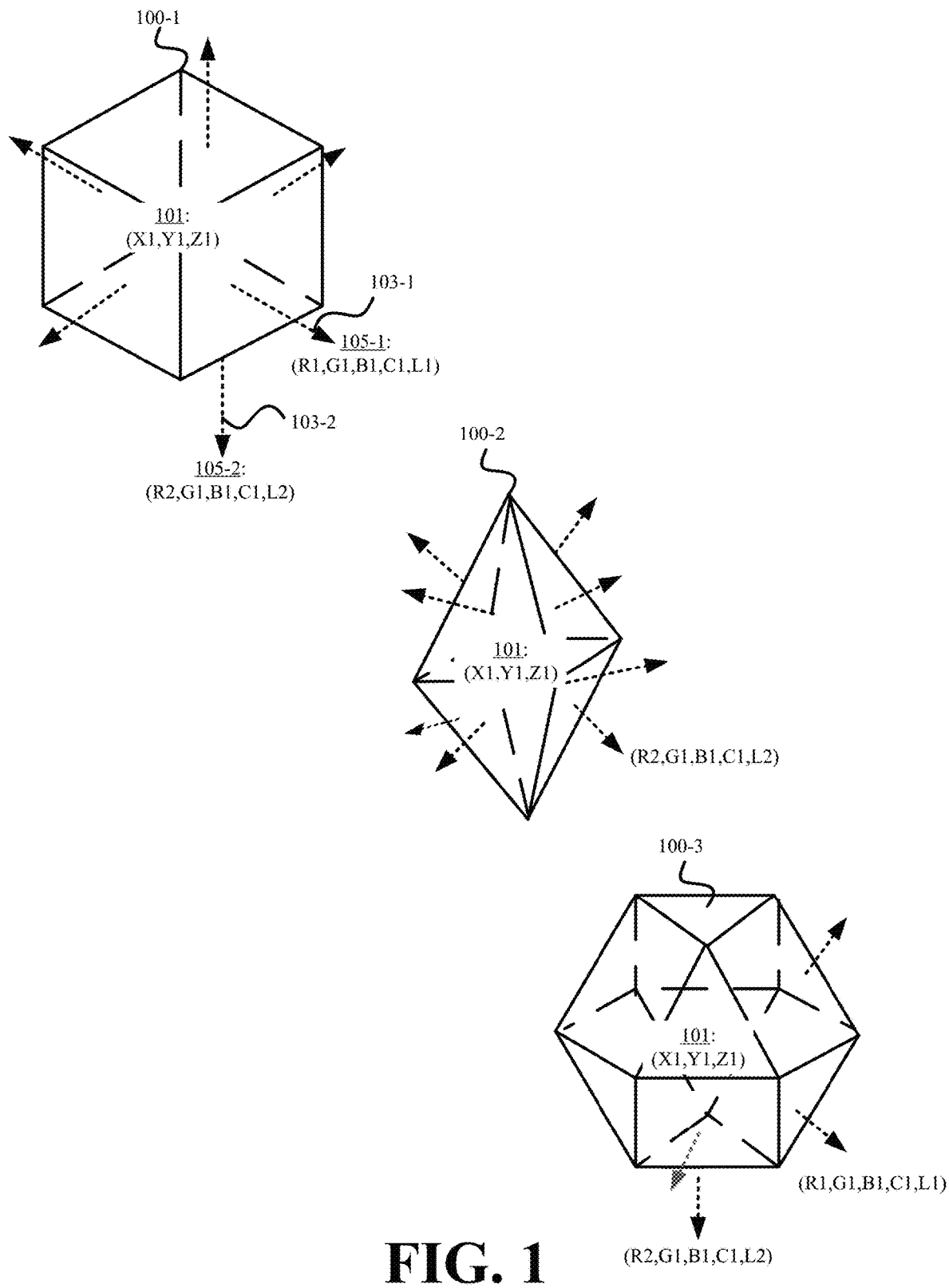
FIG. 1 illustrates examples of different multi-faceted primitives in accordance with some embodiments presented herein.

FIG. 1 illustrates examples of different multi-faceted primitives 100 in accordance with some embodiments presented herein. Multi-faceted primitives 100 include first multi-faceted primitive 100-1 represented as a six-sided cube, second multi-faceted primitive 100-2 represented as an eight-sided diamond, and third multi-faceted primitive 100-3 represented as a 14-sided polyhedron. Multi-faceted primitives 100 may have fewer or more facets or facets in different orientations depending on the complexity or amount of variation from different angles across the surface or object represented by multi-faceted primitives 100 and/or the visual fidelity or quality that is to be preserved by multi-faceted primitives 100.

Multi-faceted primitives 100 are presented with dimensions and a 3D form in FIG. 1 to better illustrate the surface normals and the encoding of different sets of non-positional values to the different facets. However, in some embodiments, multi-faceted primitives 100 are points that do not have protruding or defined facets with dimensions or coordinates. Instead, the facets may be represented by different surface normals that extend outwards in different angles or directions from the point, and each surface normal may be associated with a different set of non-positional values.

Each multi-faceted primitive 100 is defined with positional values 101. Positional values 101 include x, y, and z coordinates. Position values 101 define the position for the multi-faceted primitive 100 in a 3D space of the polyhedral point cloud. The position of a particular multi-faceted primitive in the 3D space of the polyhedral point cloud corresponds to the position of the surface or the point about the surface represented by that particular multi-faceted primitive in the scene represented by the polyhedral point cloud. In other words, each multi-faceted primitive 100 maps the position of a surface in a scene to a corresponding position in the 3D space of the polyhedral point cloud that represents the scene.

Each facet of each multi-faceted primitive 100 is defined with a surface normal (e.g., surface normals 103-1 and 103-2) and a set of non-positional values (e.g., set of non-positional values 105-1 and 105-2). The surface normal identifies the direction or orientation of the facet, and the set of non-positional values represent the color values and/or other descriptive characteristics that were observed, measured, defined, created, synthesized, captured, or otherwise associated with the represented surface from the direction or orientation of the facet. In some embodiments, the set of non-positional values include RGB color values, other color values, reflectance, chrominance, luminance, hardness, translucence, roughness, specular, diffuse, albedo, index of refraction ("IOR"), and/or other measured characteristics of the represented surface.

A polyhedral point cloud is formed from a set of multi-faceted primitives 100. Each multi-faceted primitive 100 represents the position of a different surface or point about a surface from a scene (e.g., an image or capture of the scene or a scene that is digitally created), and different non-positional characteristics of the represented surface or point about the surface as captured from different angles, perspectives, or viewpoints. Accordingly, the polyhedral point cloud provides a point-by-point representation of the scene, and encodes the color and/or other descriptive characteristics that are associated with each represented surface or point from different angles, perspectives, or viewpoints.

Figure 2:
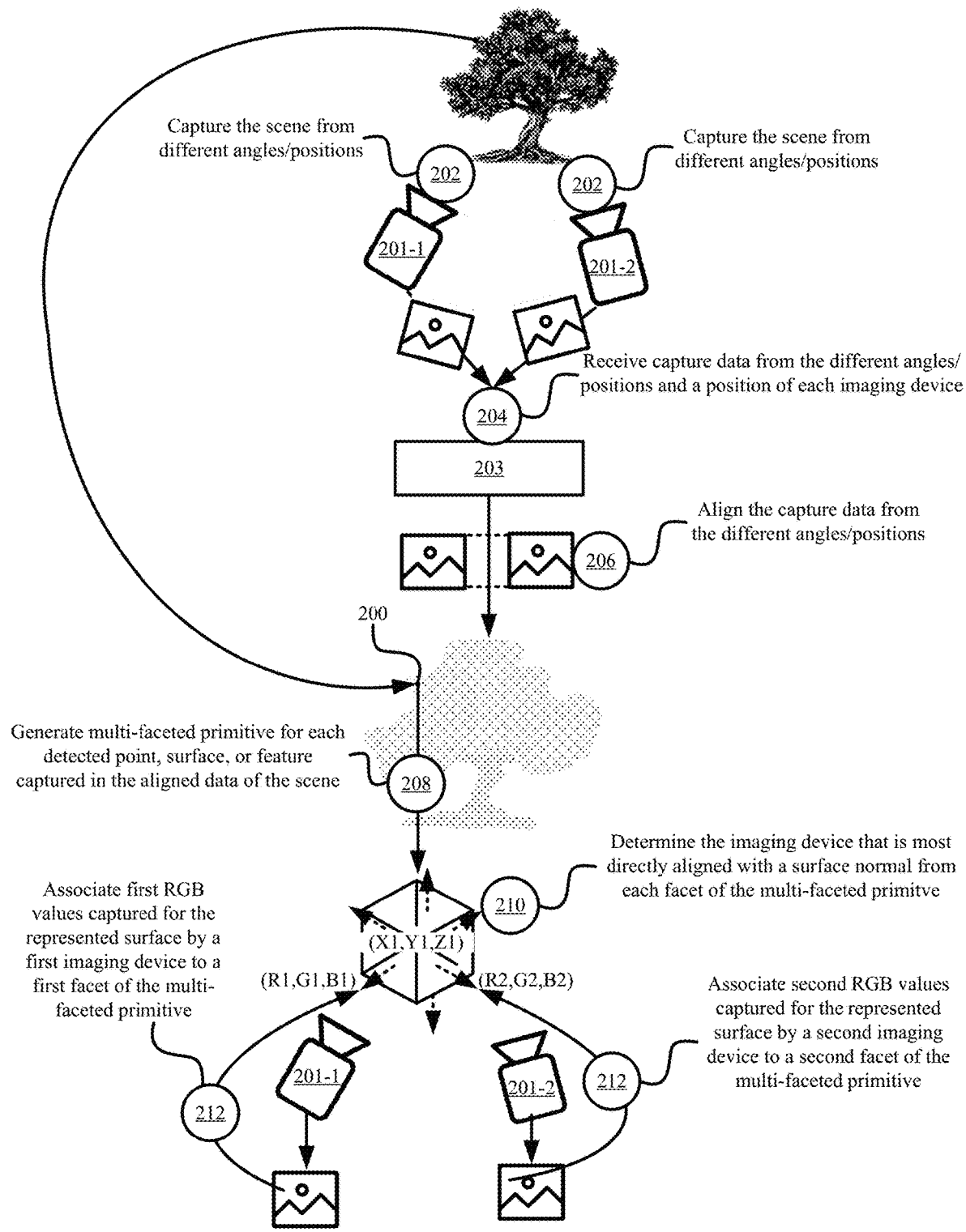
FIG. 2 illustrates an example of defining a multi-faceted primitive for a polyhedral point cloud representation of a scene in accordance with some embodiments presented herein.

FIG. 2 illustrates an example of defining multi-faceted primitive 200 for a polyhedral point cloud representation of a scene in accordance with some embodiments presented herein. First imaging device 201-1 and second imaging device 201-2 (hereinafter collectively referred to as imaging devices 201) capture (at 202) the scene from different positions.

In some embodiments, imaging devices 201 include a three-dimensional ("3D") or depth-sensing camera, Light Detection and Ranging ("LiDAR") sensor, Magnetic Resonance Imaging ("MRI") device, Positron Emission Tomography ("PET") scanning device, Computerized Tomography ("CT") scanning device, time-of-flight device, structured or patterned light imaging device, and/or other imaging equipment that emits lasers, light, sound, and/or other signaling to accurately measure the position of each point, surface, or feature within the scene as well as intensity values associated with the detected point, surface, or feature across different wavelengths or bands of the electromagnetic spectrum that are used for the distance or positional measurements. Accordingly, capturing (at 202) the scene includes generating data points, meshes, polygons, or other primitives positioned in a 3D space according to the detected positions of each point, surface, or feature measured in the scene by imaging devices 201, and associating one or more intensity values in one or more hyperspectral bands to each primitive. The intensity values correspond to non-positional characteristics of the measured point, surface, or feature. For instance, the intensity values may measure the amount by which the measured point, surface, or feature reflects a specific wavelength of the electromagnetic spectrum, and the amount of reflectance may correspond to a measure of temperature, strength, thickness, decay, and/or other non-positional characteristics of the measured point, surface, or feature.

In some embodiments, imaging devices 201 include visible light or hyperspectral cameras with sensors that generate two-dimensional ("2D") images based on captured color and/or intensity values or reflectivity across various bands of the electromagnetic spectrum. For instance, the sensors may include different sets of photosites with each photosite in a particular set of photosites capturing a specific RGB color component or different hyperspectral wavelength than other photosites in the particular set of photosites. The image data from the different sets of photosites is processed using a demosaicing, debayering, and/or other technique to derive a color value (e.g., RGB values) for each imaged point, surface, or feature that corresponds to a pixel of the image.

Polyhedron graphics system 203 receives (at 204) the data captured by imaging devices 201 from the different positions. Additionally, polyhedron graphics system 203 receives (at 204) a positional value associated with each imaging device 201 that identifies the position from which the data is captured. In other words, the positional value specifies the position from which a set of data is captured.

The data captured by each imaging device 201 includes a single set of non-positional values for the colors and/or other descriptive characteristics of the scene that are captured from the different position of that imaging device 201. The data captured by each imaging device 201 may also include a set of positional values to specify the coordinates or positions for the point, surface, or feature of the scene that is represented by a corresponding set of non-positional values.

In some embodiments, polyhedron graphics system 203 receives (at 204) data that is generated for a scene that is digitally created or enhanced. For instance, a paint package application or 3D creation application may be used to place digital objects in a scene, and to associate color variations to surfaces of the digital objects when viewed from different angles or perspectives. For instance, an artist may define the digital object, may define different surface normals for a particular surface of the digital object, and may associate different color values to each surface normal.

Polyhedron graphics system 203 aligns (at 206) the data that is associated with the same point, surface, or feature of the scene from the different positions. Aligning (at 206) the data includes mapping the non-positional values associated with a particular surface from a first position, angle, or perspective to the non-positional values that are associated with the same particular surface from a second position. In some embodiments, polyhedron graphics system 203 uses the set of positional values that is received with each set of captured data to map that set of captured data to a common space. In other words, polyhedron graphics system 203 may transform or adjust the set of positional values of each captured dataset based on the different position at which that dataset is captured. In some other embodiments, polyhedron graphics system 203 uses the set of positional values associated with each captured dataset and/or the set of non-positional values to identify common points, surfaces, or features of the scene, and to align the captured data based on the identified common points, surfaces, or features.

Polyhedron graphics system 203 generates (at 208) multi-faceted primitive 200 for each common point, surface, or feature of the scene captured or represented in the aligned data. Generating (at 208) the multi-faceted primitive 200 includes defining the set of positional values for multi-faceted primitive 200 in the 3D space of the polyhedral point cloud to correspond to the position of the point, surface, or feature from the scene that is represented by that multi-faceted primitive 200. Generating (at 208) multi-faceted primitive 200 also includes defining multi-faceted primitive 200 with two or more facets that are oriented in different directions from the position of multi-faceted primitive 200.

Polyhedron graphics system 203 projects a surface normal from each facet of multi-faceted data primitive 200. Polyhedron graphics system 203 determines (at 210) which of the different positions at which the data was captured is closest to the surface normal that is projected from a particular facet. In other words, polyhedron graphics system 203 determines (at 210) which imaging device 201 is most directly aligned with the surface normal of a particular facet, and thereby captures the non-positional values for that particular facet.

Polyhedron graphics system 203 associates (at 212) the set of non-positional values for the point, surface, or feature that is represented by multi-faceted primitive 200 and that is captured for that point, surface, or feature by whichever imaging device 201 is most aligned with the surface normal of a particular facet by a threshold degree to that particular facet. Associating (at 212) the set of non-positional values include storing or mapping the set of non-positional values captured for that point, surface, or feature by a particular imaging device 201 to the particular facet of multi-faceted primitive 200.

As shown in FIG. 2, polyhedron graphics system 203 associates (at 212) a first set of non-positional values captured by first imaging device 201-1 for a particular surface represented by multi-faceted primitive 200 to a first facet of multi-faceted primitive 200 with a surface normal that intersects or is within the threshold degree of the position of first imaging device 201-1, and associates (at 212) a second set of non-positional values captured by second imaging device 201-2 for the particular surface represented by multi-faceted primitive 200 to a second facet of multi-faceted primitive 200 with a surface normal that intersects or is within the threshold degree of the position of second imaging device 201-2.

In some embodiments, polyhedron graphics system 203 associates (at 212) the set of non-positional values captured for a surface represented by multi-faceted primitive 200 to a particular facet of multi-faceted primitive 200 from whichever imaging device 201 is closest to and within a 30 degree arc of the surface normal projecting from that particular facet. In some such embodiments, the non-positional values for some facets with surface normals that are not within a 30 degree arc of any imaging device 201 may be left empty or those facets may be made transparent. In some other embodiments, polyhedron graphics system 203 associates (at 212) the set of non-positional values captured for a surface represented by multi-faceted primitive 200 to a particular facet of multi-faceted primitive 200 from whichever imaging device 201 is closest to the surface normal projecting from that particular facet. In still some other embodiments, polyhedron graphics system 203 associates (at 212) the set of non-positional values captured for a surface represented by multi-faceted primitive 200 to a particular facet of multi-faceted primitive 200 via an interpolation of positional values captured by imaging devices 201 that are within a threshold degree arc of the surface normal projecting from that particular facet.

In some embodiments, polyhedron graphics system 203 dynamically determines the number of facets for best representing surfaces in a scene. A multi-faceted primitive with more facets is able to preserve variations in the non-positional characteristics of a surface from more angles or positions.

Some surfaces are flat and uniformly reflect light in all directions such that the different facets of a multi-faceted primitive redundantly record the same data. Polyhedron graphics system 203 defines the multi-faceted primitives that represent such uniform surfaces with fewer facets.

However, other surfaces may have hard edges, contours, varying reflectivity, and/or variations that produce measurable variations in the non-positional characteristics of the surface from different angles or perspectives. polyhedron graphics system 203 defines the multi-faceted primitives that represent surfaces with hard edges, contours, varying reflectivity, and/or other variations with more facets.

Figure 3:
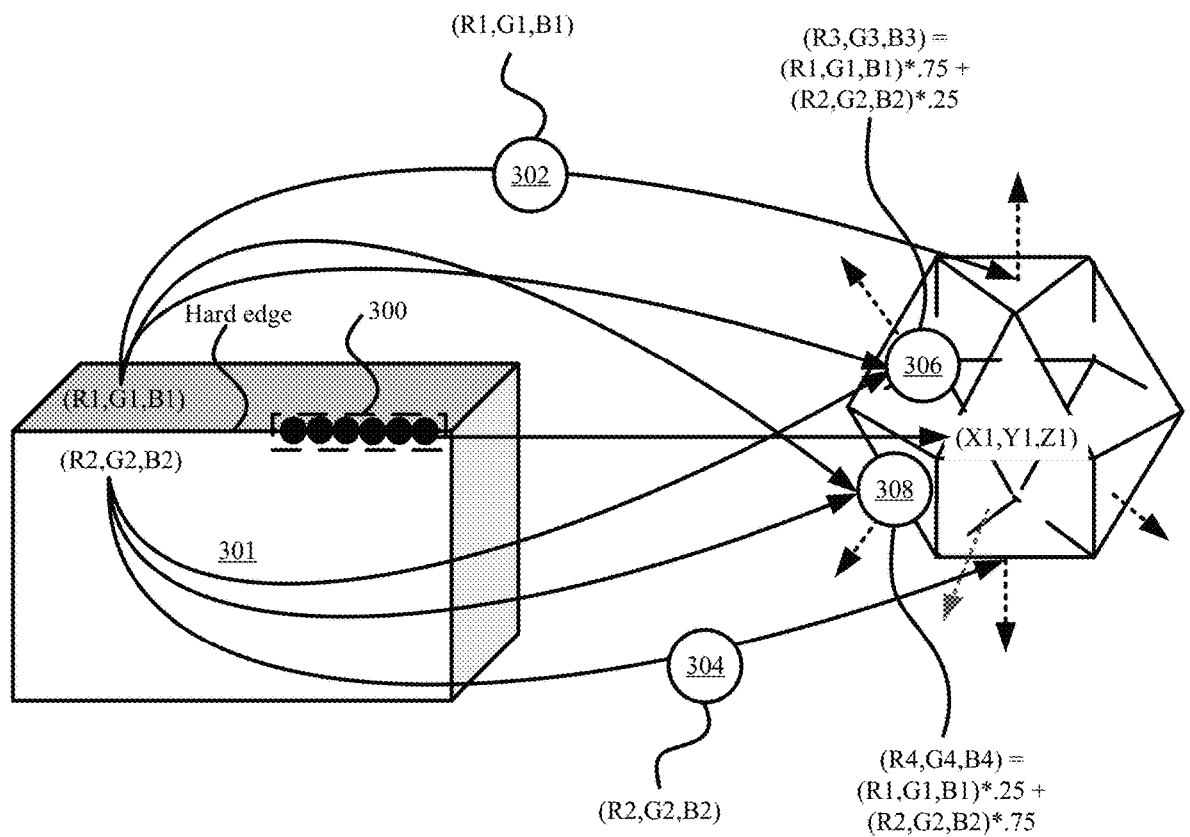
FIG. 3 illustrates an example of accurately representing a surface with a hard edge using a set of multi-faceted primitives in accordance with some embodiments presented herein.

FIG. 3 illustrates an example of accurately representing surface 301 with a hard edge using a set of multi-faceted primitives in accordance with some embodiments presented herein. The hard edge of surface 301 has an abrupt transition from one side to the next. Each side of the hard edge has a different color. For instance, FIG. 3 illustrates the top side of surface 301 having a first color represented by RGB values (R1,G1,B1), and the front side of surface 301 having a second color represented by RGB values (R2,G2,B2). Accordingly, the angle at which surface 301 is viewed has a significant impact on which color is more prominently seen. For instance, from different angles, the viewer may see a different blending of the first and second colors.

Representing the blending of the different colors may not be possible or may be inaccurately presented if the hard edge of surface 301 is represented with a single set of non-positional values. However, polyhedron graphics system 203 generates a set of multi-faceted primitives 300 to represent the hard edge. Specifically, polyhedron graphics system 203 generates each multi-faceted primitive positioned along the hard edge to store (at 302) the first color associated with a first side of the hard edge surface on a first facet with a surface normal that matches the surface normal, direction, or orientation of the first side, to store (at 304) the second color associated with a second side of the hard edge surface on a second facet with a surface normal that matches the surface normal of the second side, and to store (at 306 and 308) different blends of the first color and the second color with other facets that have surface normals matching the surface normals at which the different blended colors are visible. The different blended color combinations include different weighted combinations or interpolations of the first color and the second color. For instance, polyhedron graphics system 203 interpolates (at 306) the set of non-positional values for a third facet of multi-faceted primitive 300 based on 75% of the first color and 25% of the second color, and interpolates (at 308) the set of non-positional values for a fourth facet of multi-faceted primitive 300 based on 25% of the first color and 75% of the second color when the surface normal of the third facet is angled more towards the first side than the second side of surface 301 and when the surface normal of the fourth facet is angled more towards the second side than the first side of surface 301.

Accordingly, when rendering the polyhedral point cloud that is generated for surface 301, polyhedron graphics system 203 determines the position from which surface 301 is to be rendered, selects the facet of multi-faceted primitives 300 that have surface normals in the direction of the render position, and uses the set of non-positional values stored in conjunction with the selected facet to render the color and/or other descriptive characteristics along the hard edge of surface 301. Polyhedron graphics system 203 changes the non-positional values that are rendered for multi-faceted primitives 300 and that are used to produce the visualization of the hard edge as the viewing or render position changes.

Figure 4:
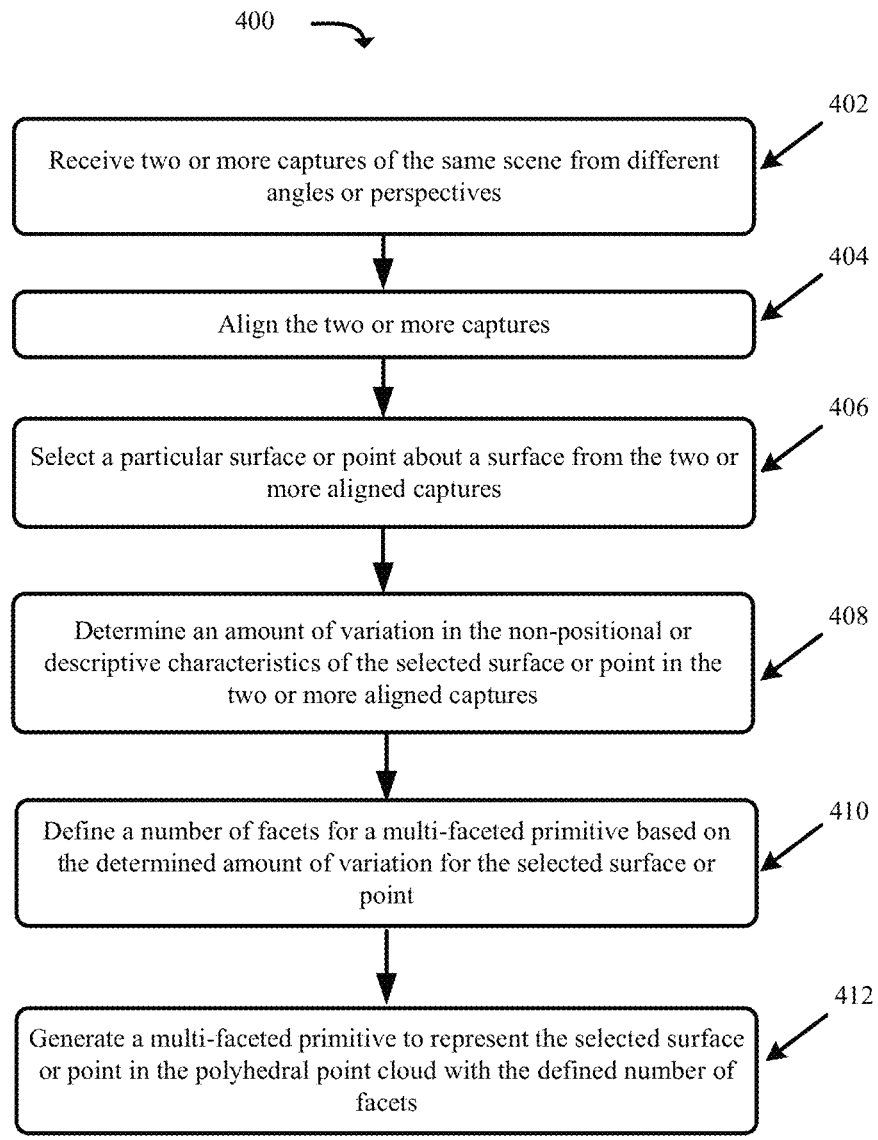
FIG. 4 presents a process for generating a polyhedral point cloud with multi-faceted primitives in accordance with some embodiments.

In some embodiments, polyhedron graphics system 203 generates a polyhedral point cloud with multi-faceted primitives that have different numbers of facets based on differing amounts of non-positional characteristic variation detected on different surfaces of a scene represented by the polyhedral point cloud. FIG. 4 presents a process 400 for generating a polyhedral point cloud with multi-faceted primitives in accordance with some embodiments. Process 400 is implemented by polyhedron graphics system 203.

In some embodiments, polyhedron graphics system 203 includes one or more devices or machines for generating, encoding, decoding, editing, rendering, and/or other processing the multi-faceted primitives of a polyhedral point cloud. The devices or machines include one or more hardware processors, such as central processing units ("CPUs"), graphics processing units ("GPUs"), or accelerated processing units ("APUs"), as well as memory, storage, network, and/or other compute resources for the generation, encoding, decoding, editing, rendering, and/or other processing of the multi-faceted primitives within a polyhedral point cloud.

Process 400 includes receiving (at 402) two or more captures of the same scene from different angles or perspectives. The two or more captures may include 3D scans produced by a LiDAR or other depth or positional sensing device, images produced by color capture or hyperspectral cameras, or images of a scene that is digitally created or enhanced.

Process 400 includes aligning (at 404) the two or more captures. Aligning (at 404) the two or more captures includes detecting the same features, formations, patterns, structures, and/or other attributes that are captured from the different angles or positions in the two or more captures and that correspond to or are part of the same surfaces or points in the scene, and positioning the captures relative to one another based on the detected commonality. In other words, polyhedron graphics system 203 matches and maps a particular point about the same surface that is captured with different color and/or other descriptive characteristics in the two or more captures. In some embodiments, polyhedron graphics system 203 uses the positional information associated with each capture or the imaging device performing the captures to align the captures. For instance, the imaging positional information may identify that a first imaging device is offset from a second imaging device by 20 degrees. Accordingly, aligning (at 404) the captures may include transforming or skewing a first capture provided by the first imaging device by 20 degrees.

Process 400 includes selecting (at 406) a particular surface or point about a surface from the two or more aligned captures in order to generate a multi-faceted primitive to represent that particular surface or point about the surface in the polyhedral point cloud. As part of performing process 400, polyhedron graphics system 203 selects each and every surface or point that is mapped and represented in the polyhedral point cloud.

Process 400 includes determining (at 408) the amount of variation in the non-positional or descriptive characteristics of the selected surface or point in the two or more aligned captures. Specifically, polyhedron graphics system 203 determines (at 408) variations and differences in the color values and/or other descriptive characteristics captured for the same surface or point from the different angles. Based on the amount of variation, polyhedron graphics system 203 determines if the surface or point is part of a uniform surface or a non-uniform surface (e.g., a hard edge, contour, or other changing surface where there is an abrupt change in the descriptive characteristics on different sides of a line or vector).

In some embodiments, a user provides input to identify the regions where an abrupt change occurs. In some other embodiments, polyhedron graphics system 203 performs an image analysis and/or uses one or more artificial intelligence and/or machine learning ("AI/ML") techniques to detect the hard edges and/or other regions with abrupt changes in the aligned two or more captures.

Process 400 include defining (at 410) a number of facets for a multi-faceted primitive based on the determined (at 408) amount of variation for the selected surface or point. A greater number of facets are needed to preserve and encode a greater amount of variation that is identified from the different captures of the selected surface or point from the different angles.

In some embodiments, polyhedron graphics system 203 defines (at 410) the number of facets based on the amount of variation. For instance, polyhedron graphics system 203 defines (at 410) two facets to encode the descriptive characteristics of the selected surface or point when the determined (at 408) variation in the descriptive characteristics across all different angled captures of the selected surface or point is no more than 20% (e.g., the RGB color values are within 20% of one another in the different captures), and defines (at 410) four facets to encode the descriptive characteristics when the determined (at 408) variation is 40% (e.g., the RGB color values vary by as much as 40% in the different captures).

In some embodiments, polyhedron graphics system 203 defines (at 410) the number of facets for any variation found in the descriptive characteristics of the selected surface or point in the different captures. For instance, polyhedron graphics system 203 defines (at 410) two facets to encode the descriptive characteristics of the selected surface or point when the descriptive characteristics for the selected surface or point in a first capture differ insignificantly (e.g., by less than 1%) from the descriptive characteristics for the selected surface or point in a second capture.

In some embodiments, polyhedron graphics system 203 defines (at 410) the number of facets based on the maximum, average, or other calculated amount of variation determined for the surfaces or points in the aligned captures. In some such embodiments, polyhedron graphics system 203 generates all multi-faceted primitives of the polyhedral point cloud to have the same number of facets.

Process 400 includes generating (at 412) a multi-faceted primitive to represent the selected surface or point in the polyhedral point cloud with the defined (at 410) number of facets. Generating (at 412) the multi-faceted primitive includes selecting a shape for the multi-faceted primitive that has a form with the defined (at 410) number of facets and that orients or exposes the facets towards the position or angle at which is capture of the scene is generated. Generating (at 412) the multi-faceted primitive further includes defining a set of positional values that map the position of the selected surface or point from the scene to the 3D space of the polyhedral point cloud, generating surface normals to define the orientation or direction of each facet, and storing different sets of non-positional values from the descriptive characteristics captured for the selected surface or point in the different captures to the different facets based on the orientation or direction of the different captures or positioning of the imaging devices that produced the captures and the orientation or direction of each facet. For instance, polyhedron graphics system 203 associates the non-positional values that are captured for the selected surface or point from a particular capture to a particular facet of the multi-faceted primitive when the surface normal of the particular facet is offset from the direction or orientation of the particular capture or the position of the imaging device that produced the particular capture by less than a threshold amount (e.g., the surface normal is within 15% degrees of the position of the imaging device that produced the particular capture). More specifically, polyhedron graphics system 203 associates a first set of non-positional values captured for the selected surface in a first capture to a first facet of the multi-faceted primitive that is oriented in the direction of the imaging device that produced the first capture, and associates a second set of non-positional values captured for the selected surface in a second capture to a second facet of the multi-faceted primitive that is oriented in the direction of the imaging device that produced the second capture.

In this manner, process 400 may change the number of facets that are defined (at 410) for different multi-faceted primitives of the same polyhedral point cloud based on the amount of variation detected for different surfaces of the aligned two or more captures. Accordingly, some multi-faceted primitives of the polyhedral point cloud may have four sets of non-positional values associated with four facets of the multi-faceted primitives, and other multi-faceted primitives may have more or less sets of non-positional values associated with more or less facets of the multi-faceted primitives.

Process 400 generates (at 412) a multi-faceted primitive for each surface or point about a surface that is captured in the two or more aligned captures. The resulting polyhedral point cloud includes a set of multi-faceted primitives with each multi-faceted primitive storing two or more different sets of non-positional values for the coloring and/or other descriptive characteristics that are captured for the same surface or point about the surface from the different angles.

Polyhedron graphics system 203 includes a rendering engine for producing accurate and/or realistic visualizations from the non-positional values associated with the different multi-faceted partitive facets. The rendering engine produces a visualization of a surface represented by a set of multi-faceted primitives of a polyhedral point cloud based on the angle at which the surface is viewed or rendered and the non-positional values that are associated with the one or more facets of the set of multi-faceted primitives that are oriented toward the viewing or rendering position. Accordingly, polyhedron graphics system 203 performs a selective rendering of the polyhedral point cloud to use a subset of the non-positional values stored by the multi-faceted primitives in order to render a surface or digitally recreate the surface from different angles or positions with coloring and/or other descriptive characteristic variation that accurately matches the variation that was captured across that same surface when scanned or imaged from those different angles or positions.

Figure 5:
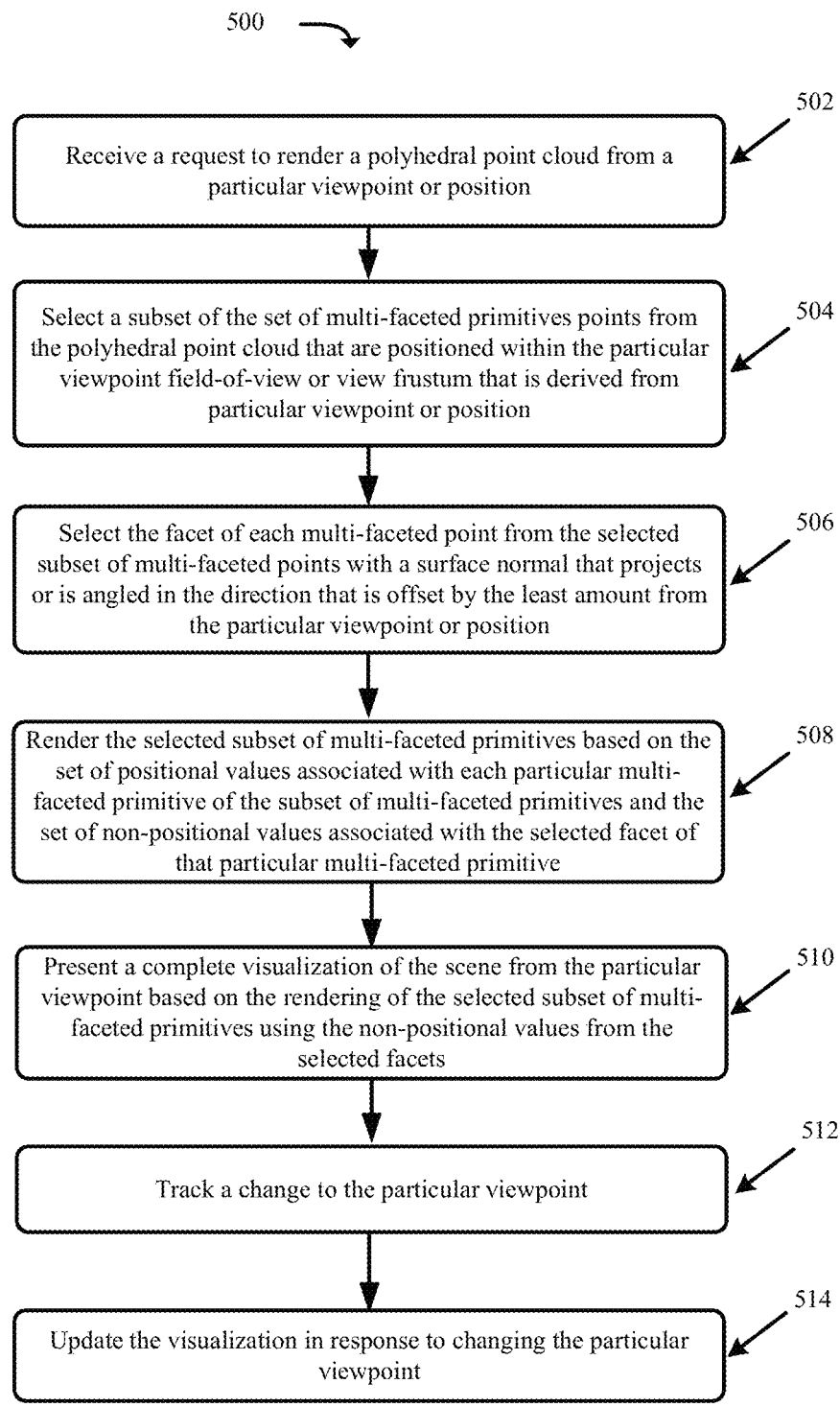
FIG. 5 presents a process for rendering the multi-faceted primitives of a polyhedral point cloud in accordance with some embodiments presented herein.

FIG. 5 presents a process 500 for rendering the multi-faceted primitives of a polyhedral point cloud in accordance with some embodiments presented herein. Process 500 is implemented by polyhedron graphics system 203.

Process 500 includes receiving (at 502) a request to render a polyhedral point cloud from a particular viewpoint or position. In some embodiments, a user defines the particular viewpoint by positioning a virtual camera within the space of the polyhedral point cloud. For instance, polyhedron graphics system 203 renders the polyhedral point cloud in a user interface ("UI") from a default position and the user is provided a tool or control for changing the render position. In some other embodiments, polyhedron graphics system 203 sets the particular viewpoint or position based on a last viewed position or a starting position that is associated with the polyhedral point cloud.

Process 500 includes selecting (at 504) a subset of the set of multi-faceted primitives points from the polyhedral point cloud that are positioned within the particular viewpoint field-of-view or view frustum that is derived from particular viewpoint or position. Polyhedron graphics system 203 may compute the coordinates within the space of the polyhedral point cloud that fall within the particular viewpoint field-of-view, and may select (at 504) the multi-faceted primitives with positional values within the computed coordinates.

Process 500 includes selecting (at 506) the facet of each multi-faceted primitive from the selected (at 504) subset of multi-faceted primitives with a surface normal that is offset by the least amount from the particular viewpoint or position. In some embodiments, polyhedron graphics system 203 projects the surface normal from each facet of the multi-faceted primitives outwards, and selects (at 506) the facet with the surface normal that intersects or passes closest to the particular viewpoint.

Process 500 includes rendering (at 508) the selected (at 504) subset of multi-faceted primitives based on the set of positional values associated with each particular multi-faceted primitive of the subset of multi-faceted primitives and the set of non-positional values associated with the selected (at 506) facet of that particular multi-faceted primitive. The set of positional values accurately recreate the structures for the surfaces of the scene that are represented by the polyhedral point cloud in 3D space, and the set of non-positional values associated with the selected (at 506) facet provides coloring and/or other descriptive characteristics to the recreated surfaces that accurately matches the variation seen when viewing that recreated surface in the real world from an angle or position of the particular viewpoint or position.

Process 500 includes presenting (at 510) a complete visualization of the scene from the particular viewpoint based on the rendering (at 508) of the selected (at 504) subset of multi-faceted primitives using the non-positional values from the selected facets. The complete visualization is presented on a display device.

Process 500 includes tracking (at 512) a change to the particular viewpoint. For instance, the user may move a virtual camera that establishes the particular viewpoint in order to view a different part of the scene represented by the polyhedral point cloud. Alternatively, an animation may define changing the particular viewpoint over time to present different parts of the represented scene.

Process 500 include updating (at 514) the visualization in response to changing the particular viewpoint. Updating (at 514) the visualization includes determining an updated subset of the multi-faceted primitives that fall within the changed field-of-view, determining the facets of the updated subset of multi-faceted primitives that are orientated towards of the changed field-of-view, and rendering the updated subset of multi-faceted primitives using the non-positional values from the facets that are in the direction of the changed field-of-view.

Figure 6:
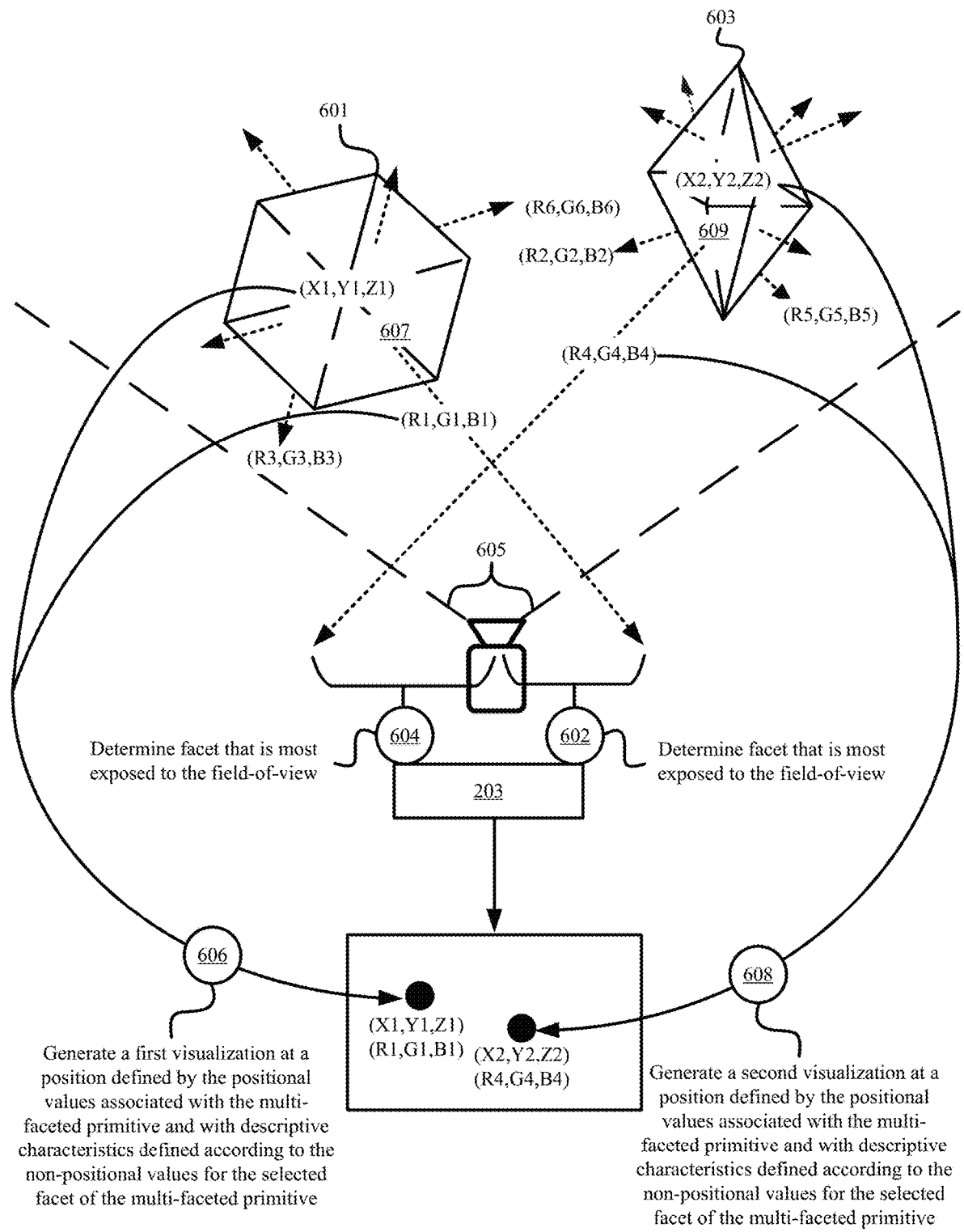
FIG. 6 illustrates an example of rendering the multi-faceted primitives in accordance with some embodiments presented herein.

FIG. 6 illustrates an example of rendering the multi-faceted primitives in accordance with some embodiments presented herein. As shown in FIG. 6, multi-faceted primitives 601 and 603 are within rendering field-of-view 605. Polyhedron graphics system 203 determines (at 602) that first facet 607 of multi-faceted primitive 601 is oriented towards or exposed to field-of-view 605, and further determines (at 604) that different second facet 609 of multi-faceted primitive 603 is oriented towards or exposed to field-of-view 605. For instance, polyhedron graphics system 203 determines (at 602 and 604) that the surface normal for first facet 607 of multi-faceted primitive 601 and the surface normal for second facet 609 of multi-faceted primitive 603 is in the direction of, closest to, and offset by less than a threshold amount from the rendering position that establishes field-of-view 605.

Polyhedron graphics system 203 generates (at 606) a first visualization (e.g., a pixel, polygon, mesh, point cloud data point, etc.) for multi-faceted primitive 601 at a position defined by the set of positional values of multi-faceted primitive 601, and with descriptive characteristics defined according to the set of non-positional values stored in association with selected first facet 607 of multi-faceted primitive 601. Similarly, polyhedron graphics system 203 generates (at 608) a second visualization for multi-faceted primitive 603 at a position defined by the set of positional values of multi-faceted primitive 603, and with descriptive characteristics defined according to the set of non-positional values stored in association with selected facet 609 of multi-faceted primitive 603.

The facets of a multi-faceted primitive may not directly face the rendering position or may not be entirely exposed to the rendering position. Stated differently, two or more facets of a multi-faceted primitive may be partially orientated towards and/or exposed to the rendering position. In such cases, polyhedron graphics system 203 may interpolate the non-positional values from the two or more facets to improve the accuracy of the generated visualization and to vary the descriptive characteristics of the visualization rather than have an abrupt change from the non-positional values of one facet to another facet.

Figure 7:
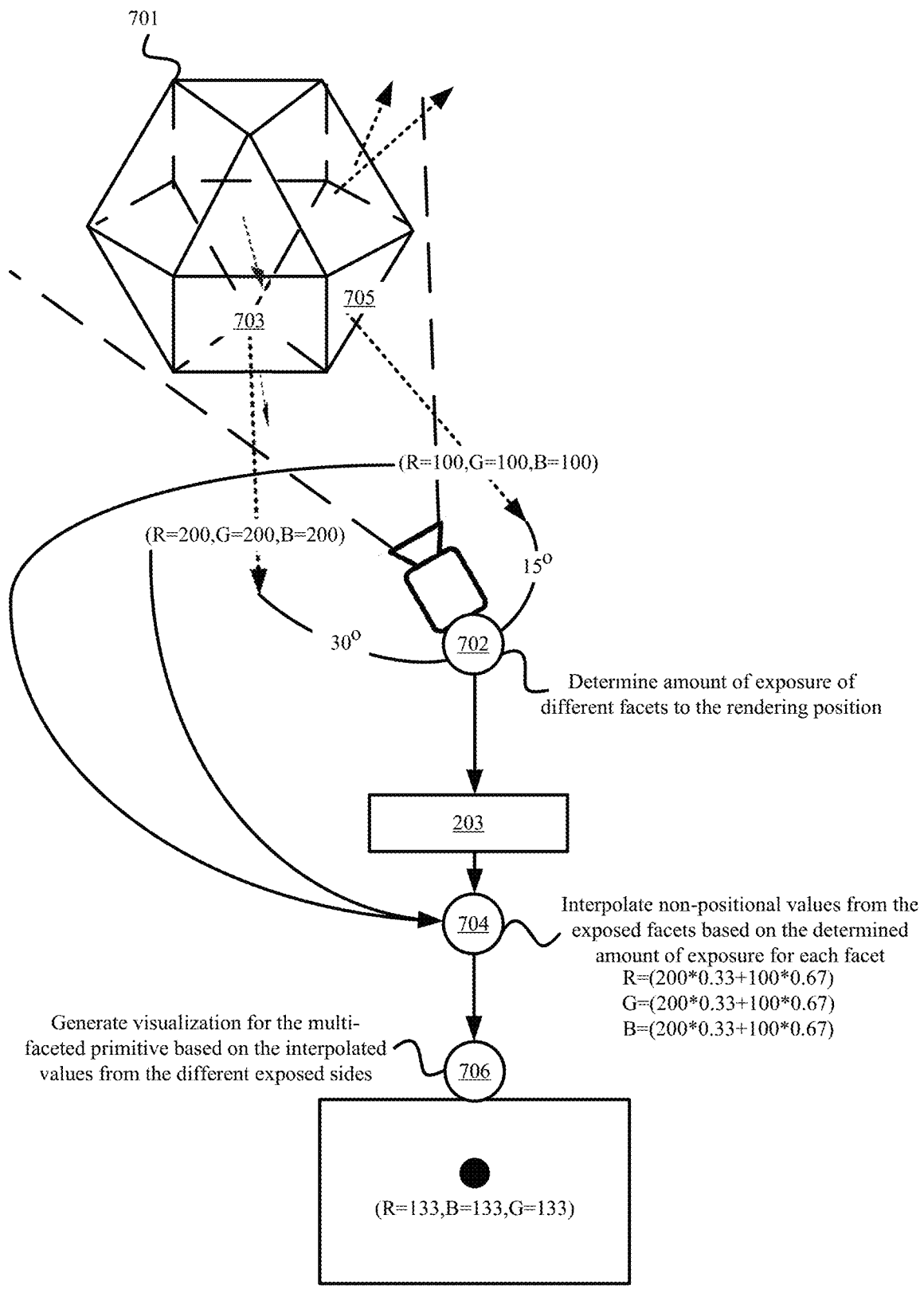
FIG. 7 illustrates an example of rendering the variation in surface coloring by interpolating the non-positional values from different facets of a multi-faceted primitive in accordance with some embodiments presented herein.

FIG. 7 illustrates an example of rendering the variation in surface coloring by interpolating the non-positional values from different facets of multi-faceted primitive 701 in accordance with some embodiments presented herein. Each of first facet 703 and second facet 705 of multi-faceted primitive 701 are exposed to the rendering position by a different amount. Polyhedron graphics system 203 determines (at 702) the amount of exposure of each facet 703 and 705 based on the degree with which the surface normal of each facet 703 and 705 is offset from the rendering position.

Polyhedron graphics system 203 generates the visualization for multi-faceted primitive 701 by interpolating (at 704) the non-positional values from first facet 703 and second facet 705 based on the determined (at 702) amount of exposure of each facet 703 and 705 to the rendering position. For instance, polyhedron graphics system 203 determines (at 702) that the surface normal of first facet 703 is offset by 30 degrees from the rendering position and that the surface normal of second facet 705 is offset by 15 degrees from the rendering position. Accordingly, interpolating (at 704) the non-positional values includes deriving the descriptive characteristics for the visualization of multi-faceted primitive 701 based on a 33% contribution or weighting of the non-positional values stored as part of less exposed first facet 703 and a 67% contribution or weighting of the non-positional values stored as part of the more exposed second facet 705.

In some embodiments, polyhedron graphics system 203 adjusts the interpolation based on different amounts of reflectivity, opacity, rigidity, and/or other descriptive characteristics associated with each facet. For instance, the non-positional values associated with first facet 703 may define greater reflectivity than the non-positional values associated with second facet 705. In this instance, polyhedron graphics system 203 may adjust the interpolation (at 704) to increase the amount by which the non-positional values of first facet 703 contribute to the derived descriptive characteristics for the visualization of multi-faceted primitive 701 despite first facet 703 being less exposed to the rendering position than second facet 705.

Polyhedron graphics system 203 generates (at 706) the visualization of multi-faceted primitive 701 based on the descriptive characteristics that are derived from interpolating (at 704) the non-positional values of first and second facets 703 and 705 based on the respective amount of exposure of each facet to the rendering position. Polyhedron graphics system 203 may update or change the visualization as the rendering position changes and the amount by which each facet of multi-faceted primitive 701 is exposed to the rendering position changes.

In some embodiments, polyhedron graphics system 203 renders the multi-faceted primitives relative to the object that is represented by the multi-faceted primitives rather than to the render position or frustum. Polyhedron graphics system 203 may render the multi-faceted primitives relative to the represented object when the generated visualization is presented on a holographic display. By rendering the multi-faceted primitives relative to the represented object on a holographic display, polyhedron graphics system 203 creates a 3D visualization that presents a different part of the represented object to viewers in different positions relative to the object and/or the holographic display.

Figure 8:
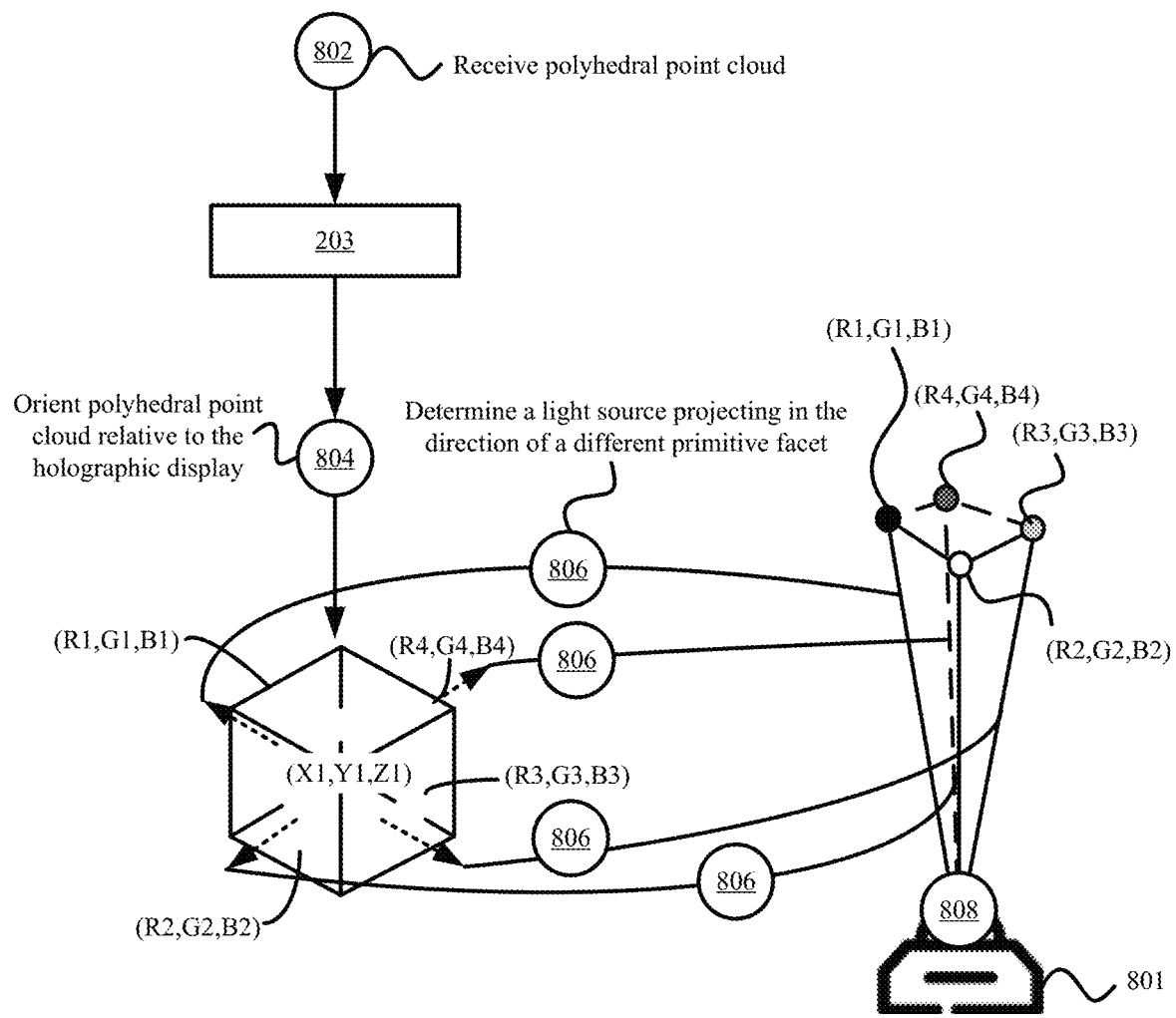
FIG. 8 illustrates an example of rendering the multi-faceted primitives relative to an object represented by the multi-faceted primitives in accordance with some embodiments.

FIG. 8 illustrates an example of rendering the multi-faceted primitives relative to an object represented by the multi-faceted primitives in accordance with some embodiments. Polyhedron graphics system 203 may include holographic display 801. Holographic display 801 has multiple light sources that are projected in different directions from holographic display 801.

Polyhedron graphics system 203 receives (at 802) a polyhedral point cloud, and orients (at 804) the polyhedral point cloud relative to holographic display 801 or a desired projection from holographic display 801. Specifically, polyhedron graphics system 203 fixes a position and orientation of the polyhedral point cloud multi-faceted primitives to a position and orientation of holographic display 801.

For each multi-faceted primitive, polyhedron graphics system 203 determines the surface normal direction for each facet of the multi-faceted primitive, and determines (at 806) a light source of holographic display 801 that projects in the same direction as the surface normal direction of that facet. Polyhedron graphics system 203 activates (at 808) the light sources to project or display a visualization of the multi-faceted primitive at a position defined by the set of positional values of the multi-faceted primitive. Each activated light source projects with a slightly different angle that corresponds to the surface normal direction of a different facet of the multi-faceted primitive and with different coloring that matches the set of non-positional values associated with that facet.

Figure 9:
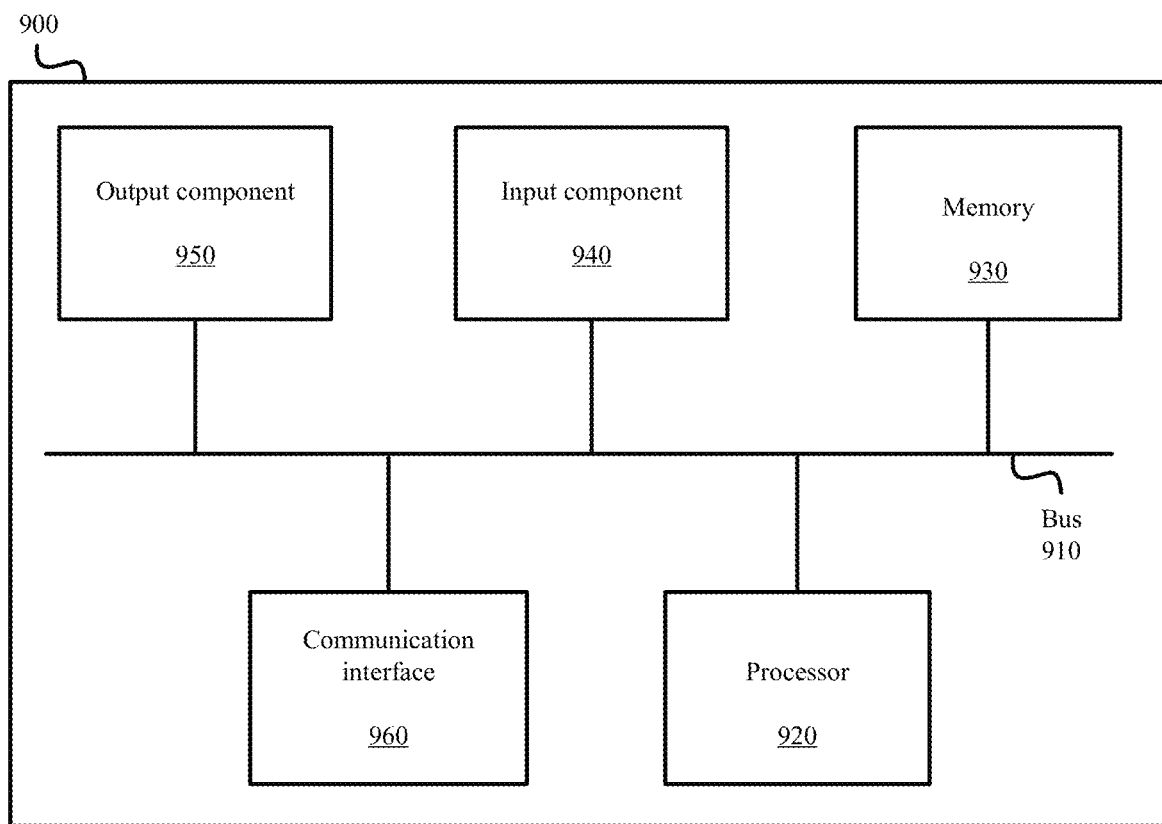
FIG. 9 illustrates example components of one or more devices, according to one or more embodiments described herein.

FIG. 9 is a diagram of example components of device 900. Device 900 may be used to implement one or more of the devices or systems described above (e.g., polyhedron graphics system 203, holographic display 801, imaging devices, display devices, etc.). Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more LEDs, etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
receiving at least first data representing a scene from a first position, and second data representing the scene from a different second position;
determining a particular point of the scene within each of the first data and the second data; and
generating a multi-faceted primitive to represent the particular point as determined in the first data and the second data, wherein generating the multi-faceted primitive comprises:
defining a first facet of the multi-faceted primitive with a first surface normal that is oriented towards the first position and with a first set of non-positional values that correspond to descriptive characteristics of the particular point in the first data; and
defining a second facet of the multi-faceted primitive with a second surface normal that is orientated towards the different second position and with a second set of non-positional values that correspond to different descriptive characteristics of the particular point in the second data.

2. The method of claim 1 further comprising:
determining that the particular point is associated with different descriptive characteristics in the first data and in the second data; and
defining a number of facets for the multi-faceted primitive based on the different descriptive characteristics associated with the particular point in the first data and in the second data.

3. The method of claim 1,
wherein defining the first facet comprises associating a first set of color values of the particular point in the first data as the first set of non-positional values; and
wherein defining the second facet comprises associating a different second set of color values of the particular point in the second data as the second set of non-positional values.

4. The method of claim 1 further comprising:
defining a single set of positional values for the multi-faceted primitive based on a position of the particular point in the scene.

5. The method of claim 1 further comprising:
determining an amount of variation between values representing the particular point in the first data and in the second data; and
defining a number of facets for the multi-faceted primitive based on the amount of variation.

6. The method of claim 1 further comprising:
determining that the first position corresponds to a capture of the scene from a first angle, and that the second position corresponds to a capture of the scene from a second angle; and
selecting a form for the multi-faceted primitive with the first facet orientated towards one or more of the first position or the first angle, and with the second facet oriented towards one or more of the second position or the second angle.

7. The method of claim 1, wherein generating the multi-faceted primitive further comprises:
defining a third facet of the multi-faceted primitive with a third surface normal oriented between the first position and the different second position, and with a third set of non-positional values that are interpolated from the first set of non-positional values and the second set of non-positional values.

8. The method of claim 1 further comprising:
entering the multi-faceted primitive into a polyhedral point cloud, wherein the polyhedral point cloud comprises a plurality of multi-faceted primitives with each multi-faceted primitive of the plurality of multi-faceted primitives comprising a plurality of facets that store different non-positional values that are associated with a different point or surface of the scene in the first data and the second data.

9. The method of claim 1 further comprising:
receiving a request to render a visualization of the scene from a particular position;
determining that the second facet is more exposed to the particular position than the first facet based on different directions of the first surface normal and the second surface normal; and
generating a visualization for the particular point of the scene based on the second set of non-positional values in response to determining that the second facet is more exposed to the particular position.

10. The method of claim 9 further comprising:
detecting an updated render position in response to a change to the particular position;
determining that the first facet is more exposed to the updated render position than the second facet based on the different directions of the first surface normal and the second surface normal; and
changing the visualization for the particular point from the second set of non-positional values to the first set of non-positional values in response to determining that the first facet is more exposed to the updated render position.

11. The method of claim 1 further comprising:
receiving a request to render a visualization of the scene from a particular position;
determining a first amount by which the first surface normal is offset from the particular position and a second amount by which the second surface normal is offset from the particular position; and
generating a visualization for the particular point of the scene from interpolating the first set of non-positional values and the second set of non-positional values according to the first amount by which the first surface normal is offset from the particular position and the second amount by which the second surface normal is offset from the particular position.

12. The method of claim 1 further comprising:
aligning the first data and the second data; and
detecting the particular point in each of the first data and the second data in response to aligning the first data and the second data.

13. A system comprising:
one or more hardware processors configured to:
receive at least first data representing a scene from a first position, and second data representing the scene from a different second position;
determine a particular point of the scene within each of the first data and the second data; and
generate a multi-faceted primitive to represent the particular point as determined in the first data and the second data, wherein generating the multi-faceted primitive comprises:

defining a first facet of the multi-faceted primitive with a first surface normal that is oriented towards the first position and with a first set of non-positional values that correspond to descriptive characteristics of the particular point in the first data; and defining a second facet of the multi-faceted primitive with a second surface normal that is orientated towards the different second position and with a second set of non-positional values that correspond to different descriptive characteristics of the particular point in the second data.

14. The system of claim 13, wherein the one or more hardware processors are further configured to:
determine that the particular point is associated with different descriptive characteristics in the first data and in the second data; and
define a number of facets for the multi-faceted primitive based on the different descriptive characteristics associated with the particular point in the first data and in the second data.

15. The system of claim 13, wherein the one or more hardware processors are further configured to:
define a single set of positional values for the multi-faceted primitive based on a position of the particular point in the scene.

16. The system of claim 13, wherein the one or more hardware processors are further configured to:
determine an amount of variation between values representing the particular point in the first data and in the second data; and
define a number of facets for the multi-faceted primitive based on the amount of variation.

17. The system of claim 13, wherein the one or more hardware processors are further configured to:
determine that the first position corresponds a capture of the scene from a first angle, and that the different second position corresponds to a capture of the scene from a second angle; and
select a form for the multi-faceted primitive with the first facet orientated towards one or more of the first position or the first angle, and with the second facet oriented towards one or more of the different second position or the second angle.

18. The system of claim 13, wherein generating the multi-faceted primitive further comprises:
defining a third facet of the multi-faceted primitive with a first surface normal oriented between the first position and the different second position, and with a third set of non-positional values that are interpolated from the first set of non-positional values and the second set of non-positional values.

19. The system of claim 13, wherein the one or more hardware processors are further configured to:
receive a request to render a visualization of the scene from a particular position;
determine that the second facet is more exposed to the particular position than the first facet based on different directions of the first surface normal and the second surface normal; and
generate a visualization for the particular point of the scene based on the second set of non-positional values in response to determining that the second facet is more exposed to the particular position.

20. A non-transitory computer-readable medium storing program instructions that, when executed by one or more hardware processors of a system, cause the system to perform operations comprising:
receive at least first data representing a scene from a first position, and second data representing the scene from a different second position;
determine a particular point of the scene within each of the first data and the second data; and
generate a multi-faceted primitive to represent the particular point as determined in the first data and the second data, wherein generating the multi-faceted primitive comprises:
defining a first facet of the multi-faceted primitive with a first surface normal that is oriented towards the first position and with a first set of non-positional values that correspond to descriptive characteristics of the particular point in the first data; and
defining a second facet of the multi-faceted primitive with a second surface normal that is orientated towards the different second position and with a second set of non-positional values that correspond to different descriptive characteristics of the particular point in the second data.

* * * * *